United States Patent [19]
Wallin

[11] Patent Number: 4,744,291
[45] Date of Patent: May 17, 1988

[54] ELECTRIC COFFEE MAKER
[75] Inventor: Gus W. Wallin, Waterbury, Conn.
[73] Assignee: Hamilton Beach Inc., Waterbury, Conn.
[21] Appl. No.: 342,924
[22] Filed: Jan. 26, 1982
[51] Int. Cl.[4] ............................................. A47J 31/16
[52] U.S. Cl. ....................................... 99/280; 99/295; 99/300
[58] Field of Search .............. 99/281, 282, 283, 295, 99/299, 300, 302 R, 307; 137/DIG. 2; 251/251, 333

[56] References Cited
U.S. PATENT DOCUMENTS

| | | |
|---|---|---|
| 877,063 | 1/1908 | Ledes ............................... 137/449 |
| 1,681,597 | 8/1928 | Sanford ............................ 251/251 |
| 2,343,663 | 3/1944 | Gregory ........................... 251/251 |
| 2,829,583 | 4/1958 | Leonard ............................. 99/282 |
| 3,230,974 | 1/1966 | Valente .............................. 99/282 |
| 4,007,674 | 2/1977 | Lichowsky ......................... 99/281 |
| 4,095,086 | 6/1978 | Ohnmacht et al. ................ 99/307 |
| 4,200,039 | 4/1980 | Anderl ................................ 99/281 |
| 4,224,503 | 9/1980 | Gijzel et al. ....................... 99/281 |
| 4,331,067 | 6/1982 | Mysicka et al. ................... 99/305 |

Primary Examiner—Harvey C. Hornsby
Assistant Examiner—Frankie L. Stinson
Attorney, Agent, or Firm—Dallett Hoopes

[57] ABSTRACT

To control temperature of brewing water, check valve of flow-through-heater-type coffee maker is modified so that travel of the check valve is adjustable to control rate of flow through the heating tube and, as a consequence, temperature of extracting water.

3 Claims, 2 Drawing Sheets

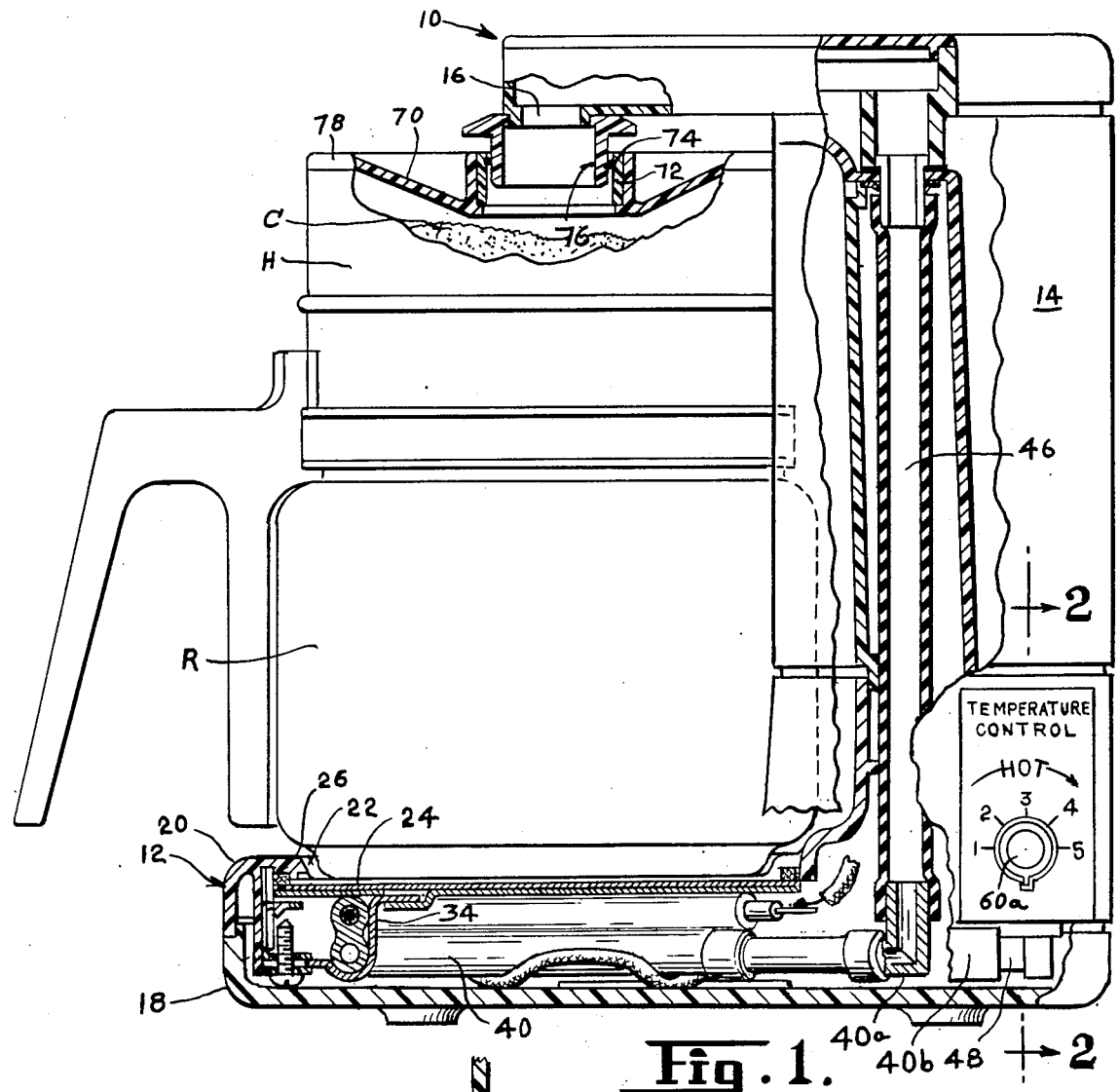
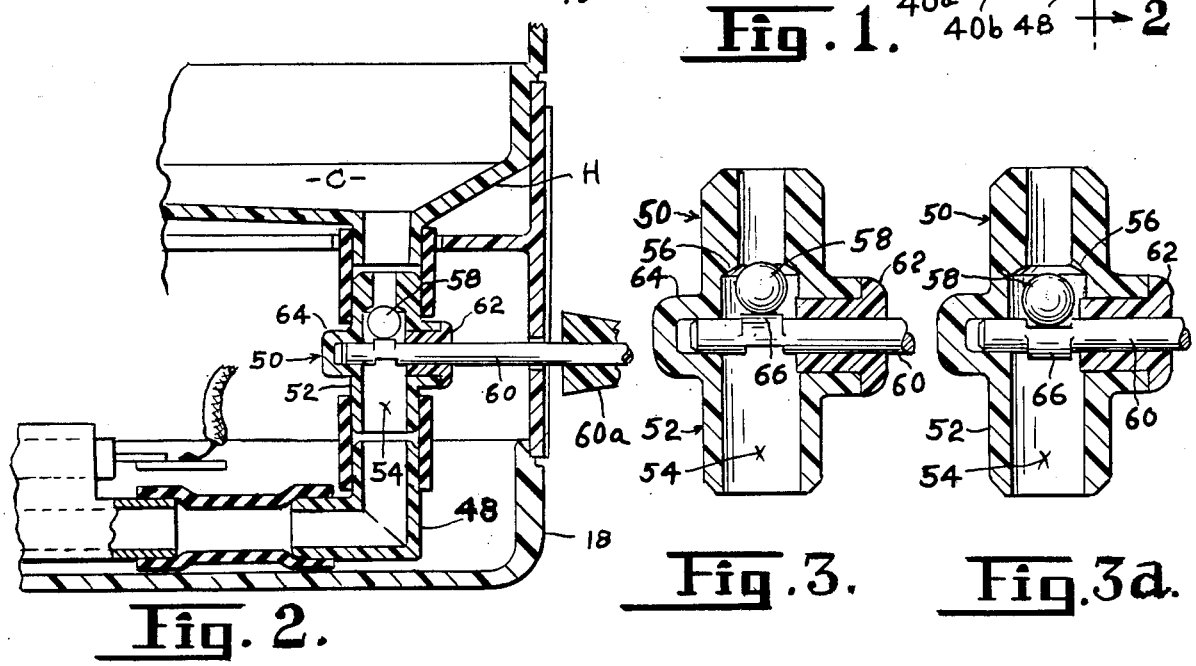

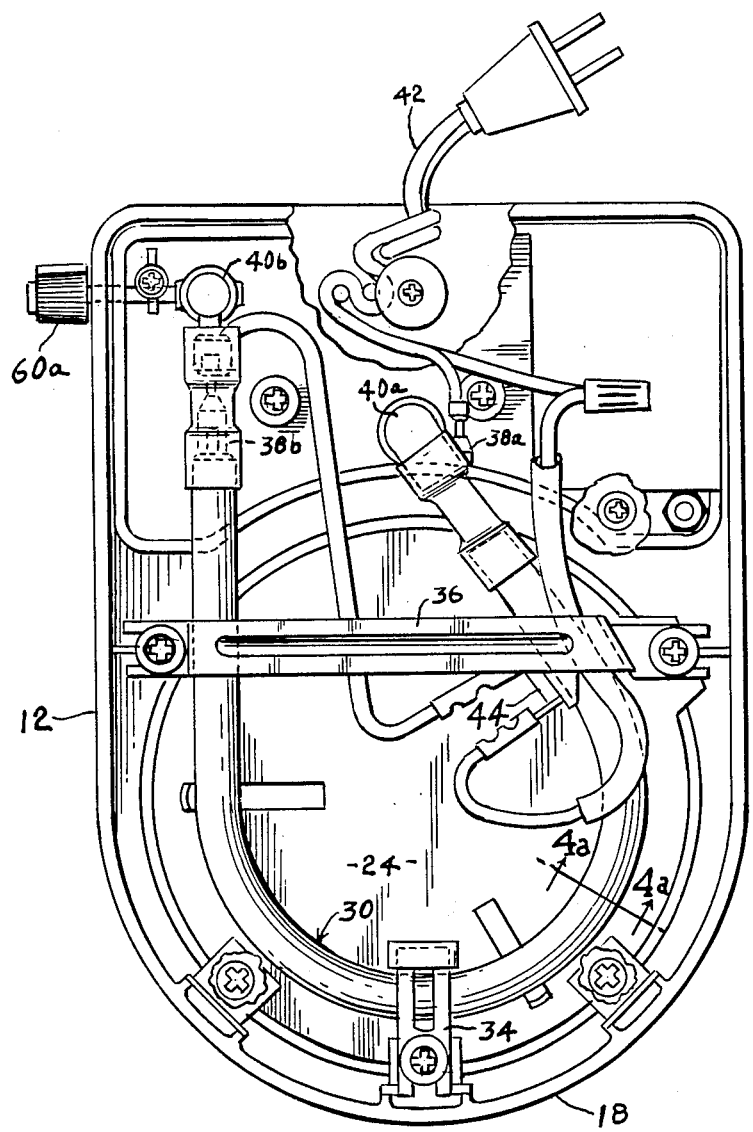
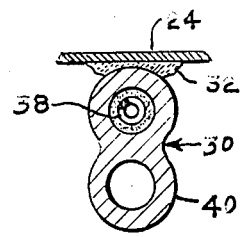
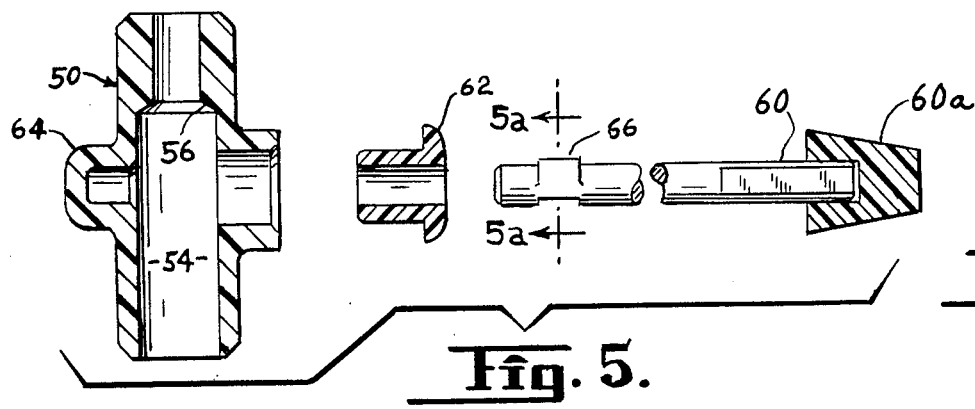

ELECTRIC COFFEE MAKER

BACKGROUND OF THE INVENTION

1. Field of the Invention

This invention relates to a single-pass drip-type coffee maker in which water from a reservoir is conducted through a flow-through heater and then to a spout overhanging the coffee bed over a coffee receiver. The receiver sits on a keep-warm plate heated by the flow-through heater. The invention relates to means for controlling the temperature of the water delivered through the spout.

2. Description of the Prior Art

In the prior art, there are a number of flow-through heater-type coffee makers. An example is shown in the U.S. Pat. No. 4,095,086 which issued June 13, 1978 to Ohnmacht. A problem that has been prevalent in prior art devices is that the heating means does not heat the water to a sufficient temperature during the first minutes of operation to extract satisfactorily the coffee essence from the coffee bed. Further, in prior devices, even well into the coffee-making cycle, the temperature of the extracting water as delivered to the coffee bed is not sufficiently hot. Preferably, the water temperature, as it reaches the bed in a single-pass coffee maker, should be approximately 200°.

Typically, the single-pass flow-through coffee maker of the art comprises a keep-warm plate on which the coffee receiver or carafe disposed. The underside of the plate has secured to it a combination heating element and water conduit. One end of the conduit is connected to the water reservoir and the other to a riser leading to the spout. A check valve is disposed in the conduit between the reservoir and the flow-through heater, blocking the movement of the water in the direction towards the reservoir. As the water heats, steam is developed creating pressure in the water heater, driving the water up the riser and out the spout. It is this general type of device to which the present invention is an improvement.

SUMMARY OF THE INVENTION

In the present invention, means are provided to control the flow of water in the flow-through heater of such a single-pass coffee maker so that the exposure time of water to the heating element is controllable and therefore the temperature of the extracting water may be accurately selected.

More specifically, in the preferred embodiment, the conventional check valve in the flow-through heater is adjustable so that the distance which the check valve unseats may be accurately controlled to meter water through the heater to control exposure time.

BRIEF DESCRIPTION OF THE DRAWINGS

Other objects and features of the invention will be apparent from references to the following specification, including the claims and drawings, all of which disclose a non-limiting embodiment of the invention. In the drawings:

FIG. 1 is a side view of a coffee maker embodying the invention, having portions broken away to show internal structure;

FIG. 2 is a slightly enlarged fragmentary sectional view taken on the line 2—2 of FIG. 1;

FIGS. 3 and 3a are sectional enlarged views of the modified check valve used in the embodiment;

FIG. 4 is a bottom plan view of the base of the coffee maker with the lower housing partly broken away;

FIG. 4a is an enlarged sectional view taken on the line 4a—4a of FIG. 4.

FIG. 5 is an exploded view of a check valve as used in the invention; and

FIG. 5a is a sectional view taken on the line 5a—5a of FIG. 5.

DESCRIPTION OF THE PREFERRED EMBODIMENT

Referring more specifically to the drawings, the coffee maker embodying the invention is designated 10 in FIG. 1. It comprises a base 12, an upstanding reservoir 14 mounted at the rear of the base, and a spout 16 superposing the reservoir 14 and adapted to deliver hot water to a coffee bed C disposed in the holder H. Coffee drops from the holder through slots (not shown) to the underlying receiver R.

More specifically, the base may comprise a lower half 18 and an upper half 20. The upper half, as is conventional, is formed with a circular opening 22 through which is exposed the warm-up plate 24. As shown (FIG. 1), the lip 26 of the opening 22 engages the upper surface of the warm-up plate.

As shown in FIG. 4, a generally "U"-shaped extrusion 30 may be welded to the underside of the warm-up plate 24 as at 32. A clip 34, secured to the underside of the top half 20 of the base, holds the warm-up plate heating assembly upward in its opening 22 with the assistance of the strap 36.

As is well known in the art, the extrusion 30 comprises a Calrod 38 and a tubular conduit 40. The opposite ends of the Calrod 38a and 38b are attached to an electric lead 42 in series with a thermostat 44 (FIG. 4).

Generally speaking, the opposite ends 40a and 40b of the tubular conduit 40 are connected to the riser 46 and the reservoir 14 respectively (FIG. 1). More specifically, the bottom of the reservoir connection 48 is connected to one side of a check valve 50 of the ball check variety and adapted to be disposed either in a vertical (as shown) disposition or a horizontal disposition. The other side is connected to the tubular conduit 40.

Typically, in the past, the check valve has been of the ball check type. In the present invention, however, the check valve is modified so as to serve also as a metering valve to meter the water moving from the reservoir into the conduit 40.

More specifically in referring to FIGS. 3 and 3a, the body 52 is formed with a stepped bore 54 reducing as at 56 to define a bevelled seat. A ball check element 58 is provided and adapted to selectively engage seat 56. A turnable shaft 60 with control knob 60a (FIG. 1) is journaled as shown in a bushing 62 and a bored boss 64 in the body. The shaft is formed with an offset lobe 66 and the dimensions are such that, by rotating the shaft 60, the travel of the ball toward and away from the seat 56 may be enlarged or reduced with a consequent increase or decrease in the area of passage for water between the ball and the seat 56.

More specifically, when the shaft 60 is in the position shown in FIG. 3, even at its farthermost point from the seat; i.e., when it engages the high point of lobe 66, the ball permits very little liquid to pass around it. In contrast, with the shaft in the position shown in FIG. 3a, the ball at its farthermost point from the seat 56 permits considerable flow. In both positions and in all positions of the shaft 60, the ball continues to operate as a check valve blocking altogether flow of liquid back up into the reservoir 14.

As a consequence of the structure shown in FIGS. 3 and 3a, the rate of movement of liquid in the direction of the spout 16 can be controlled by the position of the shaft according to setting of the knob 60a. The rate at which the water flows, it will be understood, affects the amount of time of exposure of the water in the conduit 40 to the heat of the Calrod 38 and, as a consequence, the temperature of the water discharging from spout 16 onto the coffee bed C.

After some experience of use with the apparatus described, the operator will find the best setting will depend on the number of cups of coffee to be brewed. For instance, if only a small number of cups, say three or four, are to be made, then the setting of the shaft 60 should be with the ball closer to the position shown in FIG. 3 so that the very hottest possible water will be delivered to the bed C so that the extraction can be relatively quick. For a large number of cups, a less hot setting, more like that of FIG. 3a, can be tolerated. It will be understood that for the larger number of cups at the less-hot setting, the brewing time will be slower the less hot the setting.

Another feature of the apparatus but serving in unitary fashion with the described temperature control to deliver water from the spout at the proper temperature, is the insulating annular flange 70 which surrounds the spout. Pressed into the boss of the flange 70 is a collar 72 featuring an "O" ring 74, the collar riding telescope-fashion on the spout itself 76.

The O-ring 74 serves as a seal and holds the assembly on the spout in a frictional engagement; that is, the O-ring, disposed in a groove in the collar, snugly engages the spout. The periphery 78 of the flange engages the sidewall of the holder H to retain as much as possible the heat of the water within the holder to avoid loss of temperature between the spout and coffee bed C. An incidental value of the insulating flange 70 is that the noise attributable to the expansions of water into steam, which noise is common in devices of this sort, is sharply reduced or muffled.

The invention has been described as embodied in a single structure. It should be clear, however, that variations may be made, all of which fall under the invention and within the ambit of the following claim language and equivalents thereof.

I claim:

1. In an electric coffee maker comprising a reservoir for water, said reservoir having a lower end, a holder of coffee grinds superposing a coffee collection container, conduit means connecting the lower end of the reservoir to a spout at a level well above the lower end of reservoir, electric heating means adjacent the conduit means for heating the water, check valve means in the conduit means comprising a ball valve seat and a ball valve element for the purpose of utilizing pressure of steam generated in the water as it heats to move the water toward the spout, the ball being downstream from the ball valve seat, the improvement of control means for controlling the rate of flow through the conduit means, the control means comprising a manually turnable shaft downstream from the ball valve element, the shaft having an axis transverse to the flow of water and a cam lobe on the shaft whereby when the shaft is turned, the lobe engages against the ball valve element to limit the travel of the ball to a desired extent.

2. The improvement as claimed in claim 1 wherein the spout is circumposed by a flange having a central opening and being telescopically associated with the spout, the perimeter of the flange adapted to cover the top of the holder of coffee grinds for the purpose of reducing heat loss to the water between the spout and the holder.

3. An electric coffee maker having a water reservoir and a water flow path connected to the reservoir and containing a free-valve-element-type check valve to block flow towards the reservoir the free valve element being downstream from its seat, flow-through heating means downstream from the check valve to heat the water and generate steam to drive the water away from the reservoir and control means controlling the water flow through the check valve in the direction away from the reservoir, the control means comprising surface means adjacent the side of the free valve element farthest downstream from the seat and moveable from outside the coffee maker to various positions closer to and farther away from the seat to set the farthest position of the free element from the seat and thereby control flow through the heater.

* * * * *